US 6,655,469 B1

(12) United States Patent
Davis

(10) Patent No.: US 6,655,469 B1
(45) Date of Patent: Dec. 2, 2003

(54) TURF COMBER

(75) Inventor: Michael E. Davis, Indianapolis, IN (US)

(73) Assignee: Greensgroomer Worldwide, Inc., Indianapolis, IN (US)

(*) Notice: Subject to any disclaimer, the term of this patent is extended or adjusted under 35 U.S.C. 154(b) by 0 days.

(21) Appl. No.: 10/153,931

(22) Filed: May 23, 2002

(51) Int. Cl.[7] .............................................. A01B 35/00
(52) U.S. Cl. ....................... 172/622; 172/142; 172/615; 172/643
(58) Field of Search ................. 172/622, 613, 172/614, 615, 624, 643, 634.5, 142

(56) References Cited

U.S. PATENT DOCUMENTS

| 2,881,844 A | | 4/1959 | Miller | |
|---|---|---|---|---|
| 3,976,145 A | * | 8/1976 | Blair | 172/615 |
| 4,220,211 A | * | 9/1980 | Hake | 172/618 |
| 4,304,306 A | * | 12/1981 | Maust et al. | 172/643 |
| 4,422,510 A | | 12/1983 | de Ridder | |
| 4,476,938 A | | 10/1984 | McKay | |
| 4,589,497 A | * | 5/1986 | Kovar | 172/707 |
| 4,615,286 A | * | 10/1986 | Linton | 111/52 |
| 4,645,012 A | | 2/1987 | Hansen et al. | |
| 4,896,730 A | * | 1/1990 | Jarrett et al. | 172/40 |
| 4,989,676 A | * | 2/1991 | Rogers | 172/438 |
| 5,018,587 A | * | 5/1991 | Gandrud et al. | 172/612 |
| 5,044,449 A | * | 9/1991 | Stirek et al. | 172/634 |
| 5,152,348 A | | 10/1992 | Flanagan, Sr. et al. | |
| 5,251,704 A | * | 10/1993 | Bourgault et al. | 172/311 |
| 5,477,927 A | * | 12/1995 | Figura | 172/29 |
| 5,492,182 A | * | 2/1996 | Delaurier | 172/615 |
| 5,535,831 A | * | 7/1996 | Jacobs | 172/29 |
| 5,622,229 A | * | 4/1997 | Degelman | 172/621 |
| 5,833,013 A | * | 11/1998 | Davis | 172/612 |
| 5,868,206 A | | 2/1999 | Miller | |
| 5,918,684 A | * | 7/1999 | Tozer | 172/199 |
| 5,988,294 A | * | 11/1999 | Hubscher | 172/453 |
| 6,164,386 A | * | 12/2000 | Delaurier | 172/622 |

* cited by examiner

Primary Examiner—Victor Batson
(74) Attorney, Agent, or Firm—Woodard, Emhardt, Moriarty, McNett & Henry LLP

(57) ABSTRACT

A turf combing device. A plurality of spring biased tines are fixedly mounted to rods rotatably mounted to a frame. Pivot arms fixedly mounted to the opposite ends of the rods are pivoted thereby rotating the rods and positioning the tines relative to ground.

13 Claims, 4 Drawing Sheets

TURF COMBER

BACKGROUND OF THE INVENTION

1. Field of the Invention

The present invention relates generally to the field of devices for dethatching grass and for raking of synthetic turf.

2. Description of the Prior Art

There is a need to dethatch fields of grass including golf courses having t-boxes fairways and greens. Thus, there are various vehicles having downwardly extending spring biased tines that engage the grass as the vehicle is moved across a field. The tines are rods that extend into the grass and when moved comb the turf pulling up thatch and removing runners. The downwardly extending rods are integrally connected to spring biased coils mounted on horizontally extending rods across the width of the vehicle. Depending upon the type of the field and amount of thatch, it is necessary to adjust the tines relative to the angle of contact with the ground. Due to changing field conditions, it is desirable to provide suitable adjustment means to allow easy and quick adjustment of the angle between the tine and ground. A particular need is a row of tines having an infinite adjustment relative to the angle of contact with the ground allowing the tines to be set at varying degrees of aggressiveness. Disclosed herein is a turf comber having such adjustable tines.

Sports fields include both grass fields and synthetic turf. Some synthetic turf includes synthetic grass imbedded in synthetic field material. The base material must be groomed. In many cases, the grooming must occur not only in dry conditions but also in wet conditions. As in the case of grass fields, it is also necessary to provide tines that may be quickly and easily adjusted relative to the angle of ground contact in order to ensure a uniform level playing surface. It is also desirable to brush the fill material prior to combing and thus, the device disclosed herein includes a plurality of turf engaging brushes positioned forward of the tines. The tines may be mounted directly to the brush frame or to an auxiliary frame attached to the brush frame.

SUMMARY OF THE INVENTION

One embodiment of the present invention is a turf conditioner including a frame having a first bracket and a second bracket. A first rod has a first end and an opposite second end movably mounted to and between the first bracket and the second bracket. Flexible tines are mounted to the rod and have downwardly extending bottom end portions for contacting and combing the ground at a predetermined angle. A mount is attached to the frame and the rod to allow adjustment and fixation of the predetermined angle.

It is an object of the present invention to provide a new and improved device for dethatching grass.

A further object of the present invention is to provide a device for combing fill base material used with synthetic turf.

An additional object of the present invention is to provide a turf-combing device having a quick and easy adjustment to allow adjustment of the angle of contact between the combing tines and ground.

Yet another object of the present invention is to provide a combined brushing and combing device for use on real and synthetic grass.

Related objects and advantages will be apparent from the following description.

DESCRIPTION OF THE PREFERRED EMBODIMENTS

Figure 1:
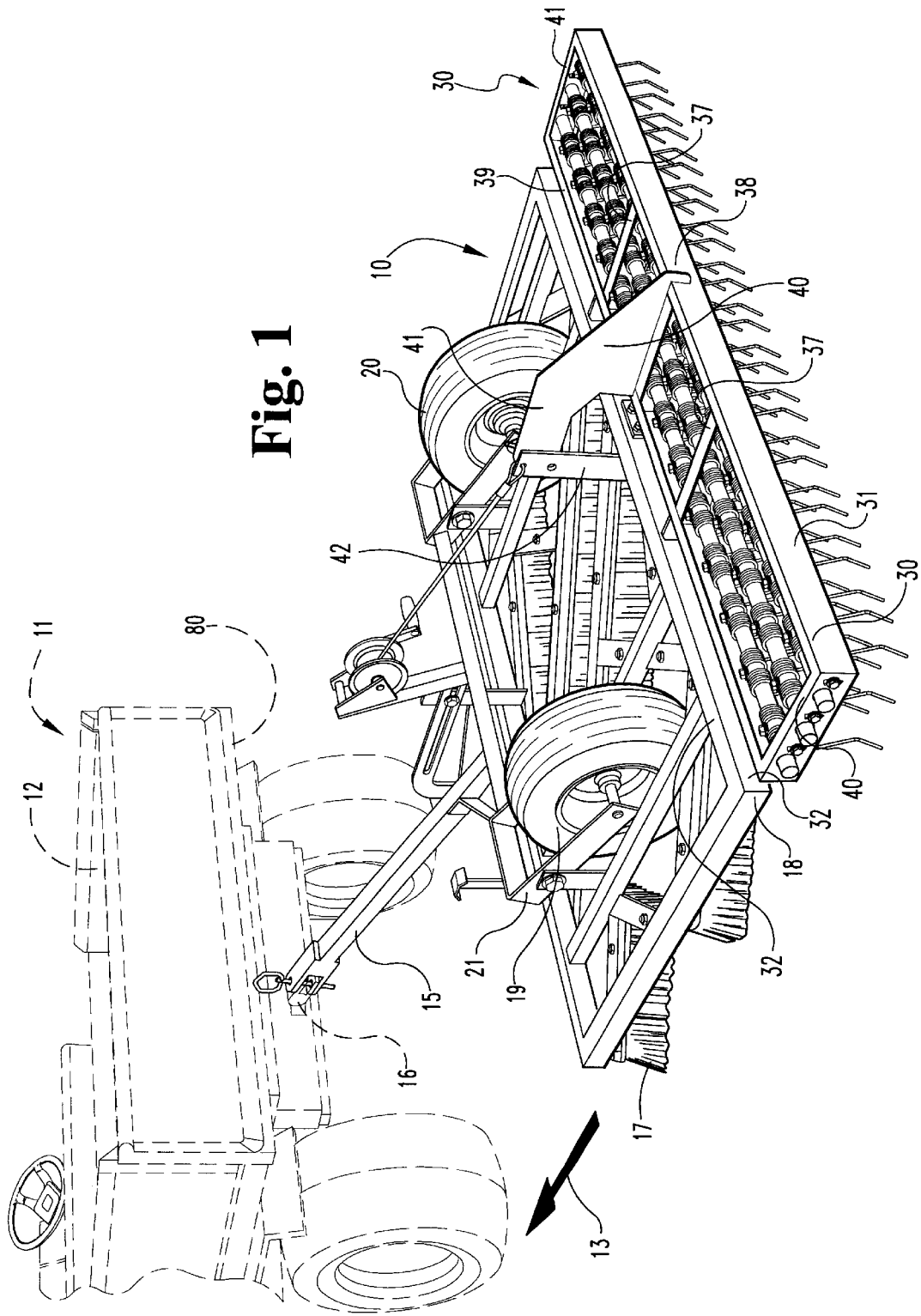
FIG. 1 is a perspective view of a turf-brushing device having mounted thereto a turf comber.

For the purposes of promoting an understanding of the principles of the invention, reference will now be made to the embodiments illustrated in the drawings and specific language will be used to describe the same. It will nevertheless be understood that no limitation of the scope of the invention is thereby intended, such alterations and further modifications in the illustrated device, and such further applications of the principles of the invention as illustrated therein being contemplated as would normally occur to one skilled in the art to which the invention relates.

Referring more particularly to FIG. 1, there is shown a turf-brushing device 10, that is disclosed and claimed in my U.S. Pat. No. 5,833,013 herein incorporated by reference. Device 10 includes a tow bar 15 attachable to the vehicle hitch 16 to be towed across a field. Device 10 includes a plurality of turf engaging brushes 17 fixedly mounted to a rectangular frame 18. A pair of wheels 19 and 20 are rotatably mounted to wheel frame 21 pivotally mounted to frame 18 and movable downwardly by a crank/cable combination or a cylinder motor for transporting the device across ground when not in a brushing mode. The wheels are pivoted to the upward position as shown in FIG. 1 when the device is in use allowing the device to sit upon the ground being supported by the plurality of brushes 17.

Figure 4:
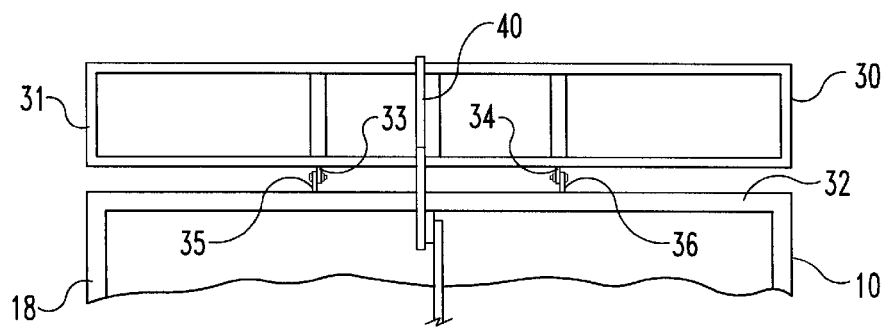
FIG. 4 is a fragmentary top view of brush device 10 and turf comber 30.

I have improved the brush device 10 by mounting to the aft end thereof a turf comber 30. Comber 30 has a rectangular frame 31 removably mounted to the rear bar 32 (FIG. 4) of frame 18 by means of a pair of forwardly extending flanges 33 and 34 integrally mounted to frame 31 and removably connected by conventional fastening devices to a pair of rearwardly extending flanges 35 and 36 integrally mounted to bar 32.

Turf comber frame 31 includes a rear wall 38 (FIG. 1) integrally attached to forward wall 39 by a pair of side walls 40 and 41. A plurality of forwardly extending strengthening members 37 are connected to and extend between rear wall 38 and front wall 39. An upwardly extending arm 40 is fixedly mounted to rear wall 38 and front wall 39 with the distal end 41 of arm 40 being fixedly secured by a conventional fastening device to an upwardly extending member 42, in turn, having a bottom end fixedly mounted to rear wall 32 of frame 18. Arm 40 along with flanges 33 and 34 therefore mount the turf comber 30 to the brush device 10 and position frame 31 above ground.

Figure 6:
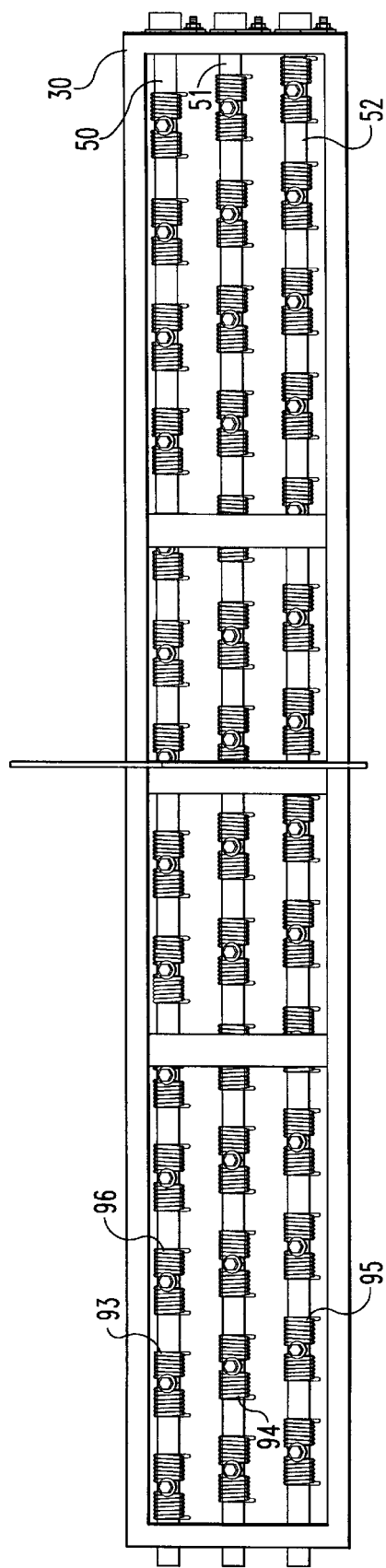
FIG. 6 is an enlarged top view of the turf comber.

Three parallel and horizontally extending rods 50, 51 and 52 (FIG. 6) have opposite ends mounted to side walls 40 and 41. The rods are rotatably mounted to walls 40 and 41 to allow adjustment of the downwardly extending tines mounted to the rods. While the description and the drawings disclose three rods 50–52, it is to be understood the present invention includes a turf comber having less than or more than three such rods.

Figure 2:
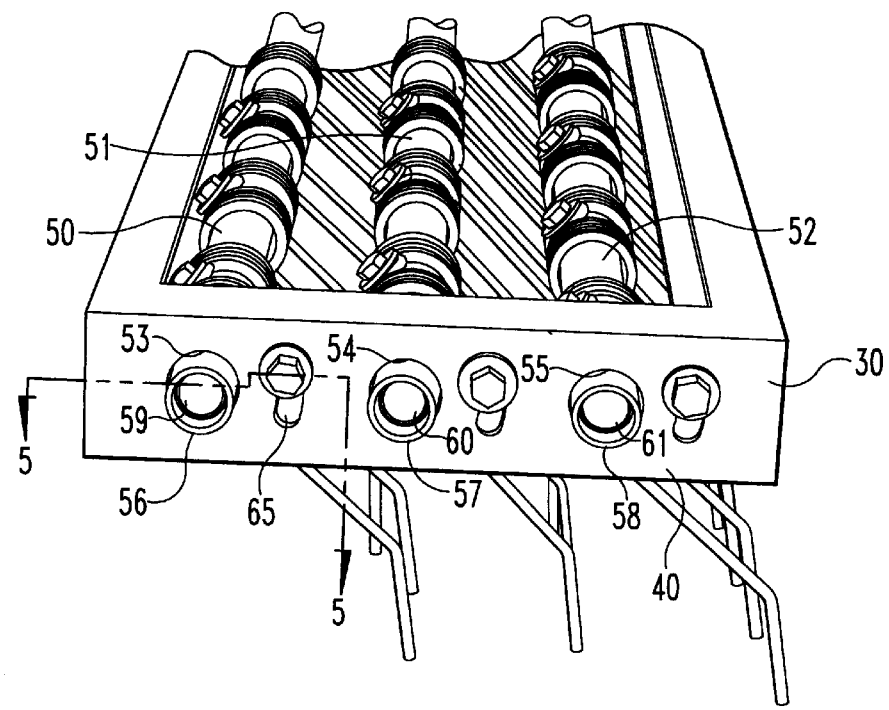
FIG. 2 is a left end perspective view of the combing device of FIG. 1

End wall 40 (FIG. 2) has three circular holes 53. 54 and 55 having rotatably mounted therein respectively three sleeves 56, 57 and 58. The three ends 59, 60 and 61 of rods 50, 51 and 52 extend into respectively sleeves 56, 57 and 58.

Figure 5:
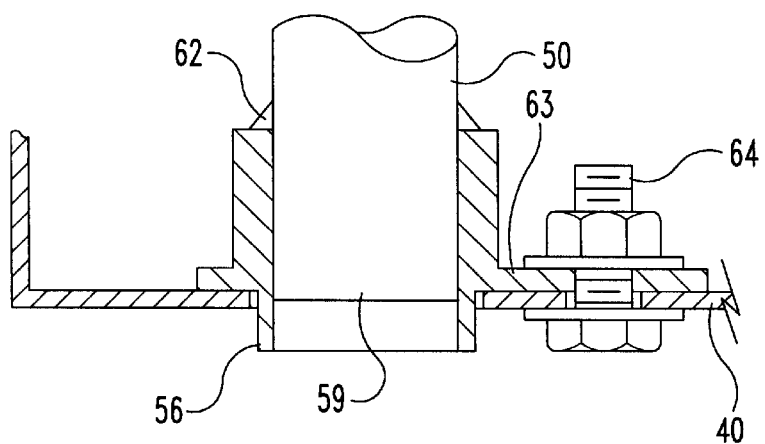
FIG. 5 is an enlarged fragmentary cross-sectional view taken along the line 5—5 of FIG. 2 and viewed in the direction of the arrows.

Sleeves 56–58 are welded respectively to tubes 50, 51 and 52 with each sleeve having a flange or arm positioned inwardly of wall 40 with the flange or arm receiving a carriage bolt that, in turn, extends through the arm into wall 40 allowing adjustment of the tine carrying rod. For example, sleeve 56 is fixed to end 59 of rod 50 by welds 62 (FIG. 5). Arm 63 is integrally and cantileverly mounted to sleeve 56 and is positioned inwardly of wall 40. A carriage bolt 64 extends through arm 63 and then through wall 40 being secured thereto by a conventional fastening device, such as a nut. An arcuate slot 65 (FIG. 2) is provided in wall 40 allowing arm 63 to be pivoted about the longitudinal axis of rod 50 to the desired location along the length of slot 65 thereby positioning rod 50 and the tines that extend downwardly therefrom in the desired position. A similar mounting connection is provided at the opposite ends of the three rods. Each rod 50–52 has an end projecting through side wall 41 and into a collared flange.

Figure 3:
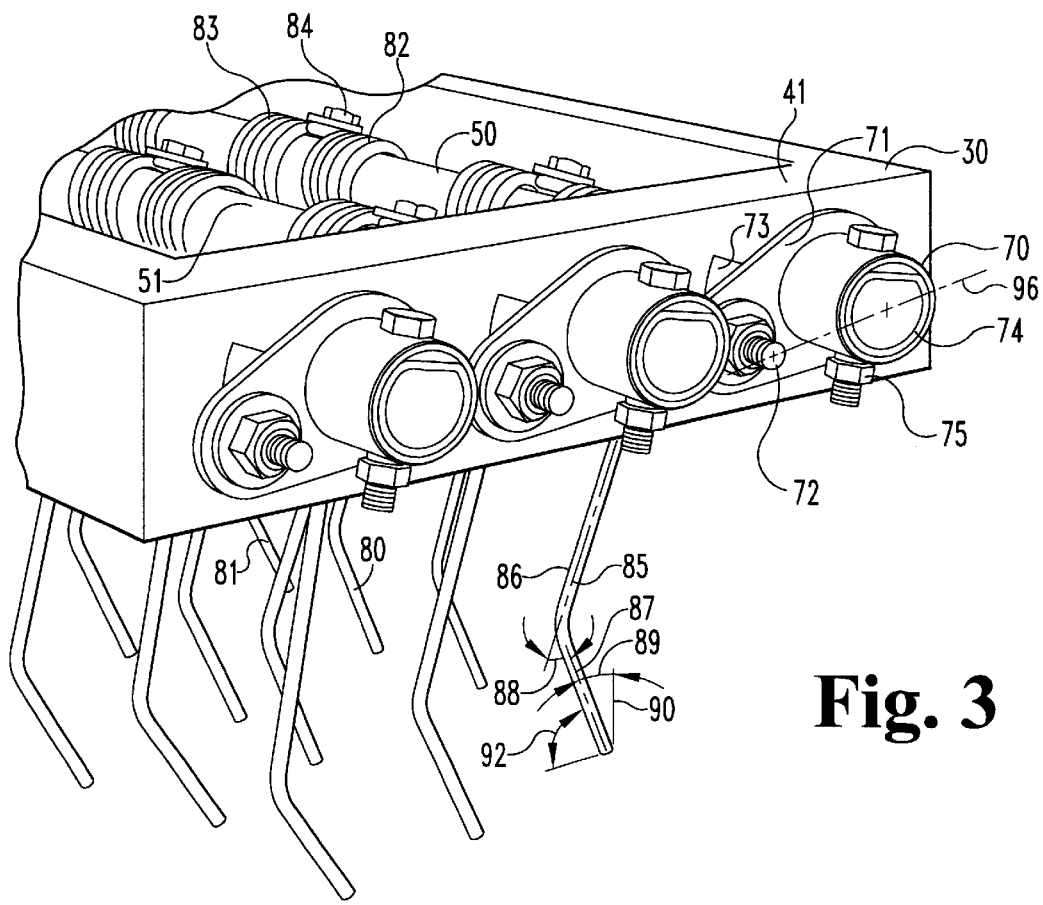
FIG. 3 is a fragmentary right end perspective view of the combing device of FIG. 1.

The following description will apply to rod 50 it being understood that an identical description applies to rods 51 and 52. Rod 50 includes an end 74 extending through collar 70 positioned outwardly of wall 41. An arm or flange 71 is integrally connected to collar 70 and extends sideways thereof having a distal end through which a conventional carriage bolt 72 extends. An arcuate slot 73 similar to slot 65 is provided in wall 41 enabling the carriage bolt that extends therethrough to move along the length of the slot thereby positioning the distal end of flange 73 at the desired location along the length of the slot. A conventional fastening device 75 extends through collar 70 and end 74 of rod 50 thereby ensuring that collar 70 rotates with rod 50. Collar 70 with its attached arm 71 are located outwardly of wall 41 whereas arm 63 attached to collar 56 is located inwardly of wall 40 and between side walls 40 and 41. Each collar and arm has a longitudinal axis extending centrally through the collar and distal end of the arm. For example, axis 96 extends centrally through collar 70 (FIG. 3) and through the distal end of arm 71 intersecting the longitudinal axis of fastening device 72 and the longitudinal axis of rod 50. Axis 96 is pivotable about the longitudinal axis of rod 50 and may be fixed relative to the horizontal about tube end 74.

The spring-biased tines extending down from turf comber 30 are commercially available. The tines are arranged in pairs. For example, tine 80 and 81 are respectively attached to a pair of spring coils 82 and 83 through which rod 50 extends. Coils 82 and 83 are connected together. A conventional fastening device 84 extends over a portion of coils 82 and 83 and into rod 50 thereby securely mounting the coils and attached tines to the rod. The tines are produced from spring wire or rod.

Each tine has a downwardly extending portion arranged at an angle with respect to its bottom distal end portion. For example, tine 85 has a downwardly extending portion 86 arranged at angle 88 to its integrally connected distal end portion 87. Distal end portion 87 is straight and arranged at angle 89 relative to vertical axis 90. By rotating rods 50–52, angle 89 may be adjusted over a range of approximately 30 degrees.

In the event aggressive combing of the grass or synthetic turf is desired, then the carriage bolts securing the arms of each collar are loosened and the rods are rotated until angle 89 is zero degrees thereby positioning the bottom end portions parallel to the vertical. For example, fastening device 72 and 64 are loosened thereby pivoting arms 71 and 63 along the length of respective slots 73 and 65 until rod 50 rotates sufficiently to align bottom end portion 87 of tine 85 with the vertical thereby decreasing angle 89 to 0. Fasteners 64 and 72 are then tightened locking the tines in place. The same procedure is followed for rods 51 and 52.

In the event a less aggressive combing action is desired, then the tines are adjusted until angle 89 is at its maximum. In the case of the embodiment shown in the drawing the maximum of angle 89 is 30 degrees thereby arranging bottom end portions 87 at an angle 92 of 60 degrees relative to the ground. In such a case, the carriage bolts 64 and 72 are again loosened with arms 63 and 71 being pivoted along the length of the arcuate slots until angle 89 is at 30 degrees, that is, angle 92 is 60 degrees.

The tines on rods 50, 51 and 52 are staggered with respect to each other across the length of the rods to provide maximum coverage. For example, the pair of tines 94 (FIG. 6) are located between but overlap the pair of tines 93 and the pair of tines 95. Tines 95, in turn, are located between and overlap the pair of tines 94 and the pair of tines 96.

Turf comber 30 is shown in the drawings as an auxiliary unit mountable to the aft end of brushing device 10. It is to be understood, however, that the turf comber 30 may be physically incorporated into brushing device 10 by mounting rods 50–52 with the associated tines in the same manner to the frame of brushing device 10 as described for frame 31. Likewise, turf comber 10 may be utilized independent of brushing device 10.

The method of treating turf comprises the steps of first providing a frame to be moved across turf with the frame including a plurality of rods rotatably mounted thereto. A plurality of spring tines are mounted to the rods and have bottom ends extending downwardly toward ground at an angle. The rods include outer ends with arms fixedly mounted thereto. The method includes the further step of selecting the desired angle 92 at the bottom ends 87 depending upon the amount of desired combing of turf, that is, aggressive or less aggressive. Next, the arms 63 and 71 attached to each rod are pivoted until the attached rod rotates to the desired position in order to position the bottom ends of the tines at the desired angle 92. The arms are then fixed in place to fix angle 92 with the frame then being moved across the turf pulling the bottom ends across and against the turf. An optional step is to brush the turf prior to moving the tines thereacross causing the turf to stand upright prior to the combing thereof during the moving step.

In one embodiment, the turf comber included three rows of 28 tines spaced ⅞ inches apart for complete coverage. Each row of the tines is adjustable to the desired level of aggressiveness. The turf comber combs through the synthetic field material relieving compaction and assuring a soft level playing surface. The bottom end portions of the tines may be arranged from a first position perpendicular to the ground to a second position wherein the bottom end portions are at a sixty degree angle to the ground.

While the invention has been illustrated and described in detail in the drawings and foregoing description, the same is to be considered as illustrative and not restrictive in character, it being understood that only the preferred embodiments have been shown and described and that all changes and modifications that come within the spirit of the invention are desired to be protected.

What is claimed is:

1. A turf conditioner comprising:

a frame having a first bracket and a second bracket;

a first rod having a first end and an opposite second end movably mounted to and between said first bracket and said second bracket;

a plurality of flexible tines mounted to said rod and having downwardly extending bottom end portions for contacting and combing the ground at a predetermined angle; and, a mount attached to said frame and said rod to allow adjustment and fixation of said predetermined angle and wherein:

said rod is rotatably mounted to said first bracket and said second bracket;

said mount includes a first arm with a first proximal end fixedly mounted to said first end of said rod and a first distal end securable to said first bracket, said arm includes a longitudinal axis extending from said proximal end to said distal end with said axis pivotable adjustable and then fixable relative to horizontal about said proximal end;

said first bracket and said distal end include an arcuate slot and fastener combination with said fastener extending through said first bracket and said distal end allowing said arm to be pivoted and fixed at different locations depending on the desired predetermined angle.

2. The turf conditioner of claim 1 wherein:

said tines have a first position wherein said bottom end portions are arranged generally perpendicularly to ground and a second position wherein said bottom end portions are arranged generally at a sixty degree angle to ground.

3. The turf conditioner of claim 2 wherein:

said tines include spring coils mounted to said rod with said bottom end portions connected to said spring coils allowing said bottom end portions to be spring biased normally engaging ground but yieldable to move therefrom.

4. The turf conditioner of claim 1 wherein:

said mount includes a second arm with a second proximal end fixedly mounted to said second end of said rod and a second distal end securable to said second bracket, said second arm includes a second longitudinal axis extending from said second proximal end to said second distal end with said second axis pivotable adjustable and then fixable relative to horizontal about said second proximal end.

5. The turf conditioner of claim 1 and further comprising:

a second rod parallel to said first rod and having opposite ends movably mounted to said first bracket and said second bracket, said second rod including a plurality of said tines mounted thereto with tines on said first rod staggered across the length of said first rod relative to said tines mounted to said second rod.

6. A turf conditioning apparatus comprising:

a frame movable across turf;

a plurality of brushes mounted to said frame to contact and cause the turf to stand upright;

a first rod movably mounted to said frame;

a plurality of spring biased tines mounted to said rod to comb through the turf, said tines include bottom ends extending downwardly from said frame at an angle relative to ground; and, a first adjuster arm fixedly connected to said rod and extending therefrom being releasably connected to said frame to allow said rod to be moved to change said angle.

7. The turf conditioning apparatus of claim 6 and further comprising:

a second rod parallel to said first rod and movably rotatably mounted to said frame and having some of said tines mounted thereto but being offset relative to tines on said first rod.

8. The turf conditioning apparatus of claim 6 wherein:

said first rod has a first and a second opposite end rotatably extending through said frame; and further comprising:

a second adjuster arm fixedly connected to said rod and extending therefrom being releasably connected to said frame to allow said rod to be moved to change said angle, said first adjuster arm and said second adjuster arm are fixedly respectively to said first and second opposite end of said rod.

9. The turf conditioning apparatus of claim 8 wherein:

said first adjuster arm is located outwardly of said frame whereas said second adjuster arm is located inwardly of said frame.

10. A turf conditioner comprising:

a frame having a first bracket and a second bracket;

a first rod having a first end and an opposite second end movably mounted to and between said first bracket and said second bracket;

a plurality of flexible tines mounted to said rod and having downwardly extending bottom end portions for contacting and combing the ground at a predetermined angle; and, a mount attached to said frame and said rod to allow adjustment and fixation of said predetermined angle and wherein:

said rod is rotatable mounted to said first bracket and said second bracket;

said mount includes a first arm with a first proximal end fixedly mounted to said first end of said rod and a first distal end securable to said first bracket, said arm includes a longitudinal axis extending from said proximal end to said distal end with said axis pivotable adjustable and then fixable relative to horizontal about said proximal end;

said mount includes a second arm with a second proximal end fixedly mounted to said second end of said rod and a second distal end securable to said second bracket, said second arm includes a second longitudinal axis extending from said second proximal end to said second distal end with said second axis pivotable adjustable and then fixable relative to horizontal about said second proximal end; and said first arm includes a collar through which said rod extends and is fixed, said first arm is located outwardly of said first bracket and said second arm is located between said first bracket and said second bracket.

11. A turf conditioner comprising:

a frame having a first bracket and a second bracket;

a first rod having a first end and an opposite second end movably mounted to and between said first bracket and said second bracket;

a plurality of flexible tines mounted to said rod and having downwardly extending bottom end portions for contacting and combing the ground at a predetermined angle;

a mount attached to said frame and said rod to allow adjustment and fixation of said predetermined angle; and, a second rod parallel to said first rod and having opposite ends movably mounted to said first bracket and said second bracket, said second rod including a plurality of said tines mounted thereto with tines on said first rod staggered across the length of said first rod relative to said tines mounted to said second rod; and a ground brushing device having mounting means connected to said frame positioning said frame and said tines behind said ground brushing device as said ground brushing device is moved across ground.

12. A method of treating turf comprising:

providing a frame to be moved across turf with said frame including a rod rotatably mounted thereto with said rod having a plurality of spring tines mounted thereon, said spring tines having bottom ends extending downwardly toward ground at an angle, said rod including an outer end with an arm fixedly mounted thereon;

selecting a desired angle that said bottom ends extend toward ground depending upon the amount of desired combing of turf;

pivoting said arm until said rod rotates to position said tines at said desired angle;

fixing said arm in place to fix said desired angle;

moving said frame across turf and pulling said bottom ends across and against turf; and, brushing said turf prior to said moving step causing said turf to stand upright prior to combing thereof during said moving step.

13. A turf conditioner comprising:

a frame having a first bracket and a second bracket;

a first rod having a first end and an opposite second end movably mounted to and between said first bracket and said second bracket;

a plurality of flexible tines mounted to said rod and having downwardly extending bottom end portions for contacting and combing the ground at a predetermined angle; and, a mount attached to said frame and said rod to allow adjustment and fixation of said predetermined angle and wherein:

said rod is rotatably mounted to said first bracket and said second bracket;

said mount includes a first arm with a first proximal end fixedly mounted to said first end of said rod and a first distal end securable to said first bracket, said arm includes a longitudinal axis extending from said proximal end to said distal end with said axis pivotable adjustable and then fixable relative to horizontal about said proximal end;

said first bracket and said distal end include an arcuate slot and fastener combination with said fastener engaged with said first bracket and said distal end allowing said arm to be pivoted and fixed at different locations depending on the desired predetermined angle.

\* \* \* \* \*